(12) United States Patent
Wiggers et al.

(10) Patent No.: US 11,116,142 B2
(45) Date of Patent: Sep. 14, 2021

(54) BINDING WRAP AND METHOD FOR HYDRATING CUT FLOWERS

(71) Applicant: Chrysal International B.V., Naarden (NL)

(72) Inventors: Marton Wiggers, Amsterdam (NL); Renata Herdink, Amsterdam (NL); Paulus Nicolaas Kapteijn, Hoofddorp (NL)

(73) Assignee: Chrysal International B.V., Naarden (NL)

( * ) Notice: Subject to any disclaimer, the term of this patent is extended or adjusted under 35 U.S.C. 154(b) by 444 days.

(21) Appl. No.: 16/052,001

(22) Filed: Aug. 1, 2018

(65) Prior Publication Data

US 2019/0037776 A1 Feb. 7, 2019

(30) Foreign Application Priority Data

Aug. 1, 2017 (NL) ...................................... 2019385

(51) Int. Cl.
| | |
|---|---|
| *A01G 5/06* | (2006.01) |
| *A01G 5/00* | (2006.01) |
| *A47G 7/06* | (2006.01) |
| *B65D 85/50* | (2006.01) |
| *B65D 65/46* | (2006.01) |

(52) U.S. Cl.
CPC .................. *A01G 5/06* (2013.01); *A01G 5/00* (2013.01); *A47G 7/063* (2013.01); *B65D 85/505* (2013.01); *B65D 65/466* (2013.01)

(58) Field of Classification Search
CPC ... A01G 5/06; A01G 5/02; A01G 5/00; B65B 11/004; B65D 85/505; B31B 2100/0022; B31B 2150/00; A47G 7/063
See application file for complete search history.

(56) References Cited

U.S. PATENT DOCUMENTS

| | | | | |
|---|---|---|---|---|
| 1,044,260 | A | * 11/1912 | Schloss ................. | B65D 85/505 47/41.01 |
| 1,690,586 | A | * 11/1928 | Main ....................... | B65D 3/06 229/400 |
| 2,247,191 | A | 6/1941 | Endres | |
| 2,309,742 | A | 2/1943 | Ballard et al. | |
| 2,540,707 | A | * 2/1951 | Beukelman ............. | A47G 7/085 47/72 |
| 2,925,208 | A | * 2/1960 | Wood ....................... | B65D 3/06 229/404 |

(Continued)

FOREIGN PATENT DOCUMENTS

| | | |
|---|---|---|
| EP | 1483988 A1 | 12/2004 |
| JP | H04-352672 A | 12/1992 |

(Continued)

OTHER PUBLICATIONS

Polyurethane MDI Handbook, 2000, BASF.

*Primary Examiner* — Monica L Barlow
(74) *Attorney, Agent, or Firm* — Leydig, Voit & Mayer, Ltd.

(57) ABSTRACT

A binding wrap for maintaining the hydration of cut flowers is disclosed. The wrap is formed by folding a flexible, absorbent sheet over and around the stems of cut flowers. An assembly of a bouquet of cut flowers with a flexible, absorbent binding wrap folded around its stems is also disclosed as is a method of forming such a wrap.

12 Claims, 7 Drawing Sheets

(56) References Cited

U.S. PATENT DOCUMENTS

| | | | |
|---|---|---|---|
| 3,271,922 A | 9/1966 | Wallerstein et al. | |
| 3,657,840 A | 4/1972 | Benoist | |
| 3,767,104 A | 10/1973 | Bachman et al. | |
| 3,899,850 A | 8/1975 | Glück et al. | |
| 4,469,502 A | 9/1984 | Heller et al. | |
| 4,784,864 A | 11/1988 | Ikeda | |
| 4,863,015 A * | 9/1989 | Toltzman | A47G 7/063 206/756 |
| 4,867,374 A * | 9/1989 | Murray | B65D 5/18 229/110 |
| 4,910,913 A * | 3/1990 | Streeter | A01G 9/026 229/108 |
| 4,946,290 A | 8/1990 | Matyja | |
| 4,972,627 A * | 11/1990 | Hori | A01G 2/20 47/64 |
| 5,106,662 A * | 4/1992 | Khayat | B65D 5/4204 206/423 |
| 5,199,242 A * | 4/1993 | Weder | A47G 7/085 53/397 |
| 5,220,760 A | 6/1993 | Dimakis | |
| 5,235,782 A * | 8/1993 | Landau | B65D 85/52 47/66.6 |
| 5,252,625 A | 10/1993 | McLaughlin et al. | |
| 5,254,600 A | 10/1993 | Blanpied et al. | |
| 5,695,058 A | 12/1997 | Dellecker | |
| 5,962,541 A | 10/1999 | Peterson et al. | |
| 6,102,204 A | 8/2000 | Castleberry | |
| 6,295,758 B1 | 10/2001 | Weder et al. | |
| 6,479,433 B1 | 11/2002 | Hann et al. | |
| 6,499,251 B2 | 12/2002 | Weder | |
| 6,665,982 B1 | 12/2003 | Van Wingerden | |
| 6,944,988 B2 * | 9/2005 | Gilbert | A01G 5/04 47/41.01 |
| 7,036,271 B2 * | 5/2006 | Hjorth | A47G 7/063 47/41.01 |
| 7,260,914 B2 | 8/2007 | O'Connor | |
| D583,256 S | 12/2008 | Rothstein | |
| 7,921,597 B2 | 4/2011 | Castleberry | |
| 8,522,475 B2 * | 9/2013 | Castleberry | A01G 24/00 47/41.01 |
| 2003/0051403 A1 | 3/2003 | Weder | |
| 2004/0134125 A1 | 7/2004 | Weder | |
| 2004/0244285 A1 | 12/2004 | Fishman et al. | |
| 2005/0086862 A1 | 4/2005 | Denicola | |
| 2005/0138861 A1 | 6/2005 | O'Connor | |
| 2005/0138862 A1 | 6/2005 | O'Connor | |
| 2005/0178060 A1 * | 8/2005 | Weder | A47G 7/063 47/72 |
| 2009/0211153 A1 | 8/2009 | Harshman et al. | |
| 2011/0099896 A1 | 5/2011 | Weder | |
| 2012/0023817 A1 | 2/2012 | Charrin | |
| 2016/0192596 A1 * | 7/2016 | Demarse | B65B 51/04 206/423 |

FOREIGN PATENT DOCUMENTS

| | | |
|---|---|---|
| JP | H06-046670 A | 2/1994 |
| WO | WO 2005/065217 A2 | 7/2005 |
| WO | WO 2016/111936 A1 | 7/2016 |

* cited by examiner

BINDING WRAP AND METHOD FOR HYDRATING CUT FLOWERS

CROSS-REFERENCE TO RELATED APPLICATIONS

This application claims priority to Netherlands Patent Application No. 2019385, filed Aug. 1, 2017, which is incorporated by reference herein in its entirety for all purposes.

TECHNICAL FIELD

The invention relates to a method for hydrating cut flowers, to an assembly of a flower bouquet and a binding wrap and to a binding wrap for flowers.

BACKGROUND ART

Shipping fresh cut flowers to customers or sellers involves the risk of dehydration. When flowers are dehydrated during transport, they will start to lose their fresh appearance. The same applies to purchased bunches or bouquets during the time between purchase and arrival at their destination. Depending on the sort of flowers, their state prior to transport and the prevailing ambient conditions, any period in which the stem is not in water is detrimental to the longevity of the blooms, as a consequence of dehydration.

It is known that wrappings can be used to cover the flower stems in order to hydrate the flowers during transport. Wrappings may be provided in various forms and are often improvised using paper, cotton (wool) or the like. Such wrappings may be folded around the flower stem ends and fixed by means of a fastening strap or elastic.

Known current methods have the disadvantage that they rely on a fastening strap, such as an elastic, in order to retain the hydrating wrap to the flower stems. Therefore, the procedure of ensuring hydration of the flowers during transport involves an additional processing step after folding the wrap around the flower stems, namely the fixing of the fastening strap. This also implies that the assembly comprises at least two components: the hydration wrap, and the fastening strap. Furthermore, it may be difficult for the consumer to release the flowers from the hydration wrap, since the elastic is usually tightly bound around the sodden wrap.

It would be desirable to provide a simpler method for hydrating flowers or otherwise maintaining them hydrated during transport.

SUMMARY OF INVENTION

Therefore, according to a first aspect of the invention, there is provided a method of maintaining hydration of a bunch of cut flowers, the method comprising the steps of
  providing a binding wrap comprising a sheet of flexible, absorbent material;
  folding an upper part of the binding wrap around the flower stems;
  folding a lower part of the binding wrap upwards over ends of the flower stems and around the upper part of the binding wrap;
  folding an upper portion of the upper part downwards over the lower part to thereby retain it.

In the present context, 'flowers' is intended to also include non-flowers such as thin branches or other horticultural objects. 'Flexible material' refers to a material which can be flexed or bent without breaking during normal usage. It will be understood that this may be the case only once the material has absorbed liquid and that such a material may be relatively less flexible when dry. 'Absorbent material' refers to a material which is able to absorb liquid, such as water, without falling apart. It will also be understood that 'upper' and 'lower' are defined with respect to the flower stems. Upper meaning closer to the flower heads, lower meanings closer to the flower stem end. Similarly, 'folding upwards' means folding in the upper direction, while 'folding downwards' means folding towards the stem ends.

The binding wrap is retained to the stems because the fold of the first folding step is first covered by a fold in the upward direction, which is itself again covered by a folding in the downward direction. In this way, the upper part and lower part hold each other in place. It may also be noted that the upper portion and lower portion encircle the stems in opposite directions. Namely, the upper portion is first folded forwards around the stems and the lower portion is subsequently folded backwards around the upper portion. In this context, forwards and backwards are relative to the initial position of the sheet against the stems.

In one embodiment the upper part is longer than the lower part. In this case, the method may comprise folding an upper portion of the upper part, that is not covered by the lower part, downwards over the lower part to thereby retain it. If the lower part has a similar length to the upper part, it will (almost) completely cover the upper part. In that case, also a part of the upper part that is covered by the lower part may be folded downwards, whereby both a portion of the upper part and a portion of the lower part are folded downwards together over their remaining portions. Advantageously, the binding wrap is thus fixed to the flower stems without the use of an elastic, fastening strap, tape or other additional ties allowing for a simplified wrapping process. It is of course not excluded that the flowers may be bound together by means of an elastic or fastening strap, prior to folding the binding wrap around it. The binding wrap can thus be easily detached from the flowers after shipping.

According to an embodiment, the binding wrap may comprise a sheet which is elastically extendable. In this context, elastically extendable is intended to refer to the ability to extend in its own plane although it may also be elastic in compression in the direction normal to the plane of the sheet. An elastically extendable sheet will tend to reassume its original shape after extending it. The elasticity improves the retaining strength of the different parts of the binding wrap.

The sheet may be manufactured of any suitable material that can provide the required properties of flexibility and absorption. The material should preferably absorb liquid well, but it should also be able to release the liquid in an efficient and gradual manner, so as to hydrate the flowers. According to one embodiment, the sheet may comprise a foam or a non-woven material. One suitable foam is polyurethane foam, such as an aromatic polyisocyanate polymer diphenylmethane diisocyanate (MDI) foam as described in U.S. Pat. No. 8,522,475, the contents of which are incorporated herein by reference in their entirety. The foam preferably has an open cell structure, with at least 50% of the pores having a diameter between 10 and 200 micron, preferably between 40 and 90 micron. It may also comprise a non-woven material, such as paper towel or corrugated cotton. Suitable non-woven materials include natural and synthetic fibre-based materials, in particular cellulose based materials such as fluff pulp and mixtures including such fibres. Obviously, the material should not be phytotoxic, so as to not damage the health of the plants.

It is also desirable that the sheet is environmentally acceptable. Biodegradable materials may be preferred or otherwise materials that can be easily recycled or reused may be considered.

The absorption of the sheet should be as high as possible, other factors being equal. The absorption may be at least 0.2 ml per square cm, preferably 0.3 ml per square cm, more preferably 0.5 ml per square cm.

According to yet a further embodiment, the binding wrap may comprise two lateral incisions, defining a border between the upper part and the lower part, extending from side edges of the sheet towards each other and separated by an intact central section. The incisions make the folding of the upper part around the flower stems easier. They reduce the mechanical connection between the upper and lower parts and therefore make it easier to fold the lower part upwards over the stem ends. Additionally, this makes it easier to subsequently fold the lower part around the upper part. This is especially convenient when the material is not very elastic. The incisions may have a lateral width of between 1 and 5 cm, depending on the overall size of the wrap. A typical size may be approximately 2 cm, or 5% to 20% of the width of the upper part. Incisions may also refer to recesses or cut-outs in the sides of the sheet towards each other. The requirement is that they need to reduce the width of the intact central section, compared to the full width of the sheet.

According to an embodiment, the upper part and the lower part of the binding wrap may be laterally offset from one another. A lateral offset between the upper part and the lower part can also make it easier to fold the lower part of the binding wrap around the upper part. The side of the lower part that sticks out sideways from the upper part can be folded around a larger fraction of the upper part than would be possible without such offset. The lateral offset may be from 1 to 5 centimeters e.g. approximately 3 cm, or 10% to 30% of the width of the upper part.

According to a further embodiment, the lower part has a larger width than the upper part or vice-versa. A larger width of the lower part with respect to the upper part can make it easier to fold the lower part of the binding wrap around the upper part. The side(s) of the lower part that sticks out sideways from the upper part can be folded around a larger fraction of the upper part than it would be possible without its larger width. A larger width of the upper part can be used to provide a tighter wrap. In one embodiment, both parts have the same width, which may be advantageous in cutting multiple binding wraps from a larger or continuous sheet of material.

According to yet a further embodiment, the method may comprise the step of placing the binding wrap into water or a liquid solution to hydrate the flowers. This step will result in a sodden binding wrap which enables it to hydrate the flowers for an extended period of time. The liquid solution may comprise flower food, flower preservative and/or other ingredients to extend the lifetime of the flowers. The wrap may be soaked prior to folding around the flowers or may be soaked after folding is completed. In particular for non-woven materials, soaking before folding may improve their flexibility.

According to another embodiment, the method may also comprise the step of placing the binding wrap, folded around the wrapped stems, into the open end of a plastic bag. The plastic bag additionally improves the retention of the binding wrap to the flower stems, and prevents liquid that is lost by the binding wrap after soaking, from leaking away. The plastic bag may be closed by an elastic or fastening strap.

According to another aspect of the invention, and in accordance with the advantages and effects described hereinabove, there is also provided an assembly of a bouquet of cut flowers and an absorbent binding wrap, wherein the binding wrap is in contact with ends of stems of the flowers such as to be able to provide hydration thereto;

an upper part of the binding wrap is folded around the flower stems;

a lower part of the binding wrap is folded upwards over the ends of the flower stems and around the upper part; and an upper portion of the upper part is folded downwards over the lower part.

The bouquet may be bound together by an elastic or other fastening strap, inside the binding wrap. The binding wrap is retained about the stems because the lower portion of the upper part of the binding wrap is covered by the lower part, which is itself again covered by an upper portion of the upper part which is folded downwards. In this way, the upper part and lower part hold each other in place and the binding wrap can be retained without additional securing means. Also a portion of the upper part that is covered by the lower part can be folded downwards. In that case, also the lower part that covers said portion of the upper part will be folded downwards. As mentioned above, this can be further improved if the material of the binding wrap is elastically extendable.

According to a further aspect of the invention, and in accordance with the advantages and effects described hereinabove, there is provided in a binding wrap for cut flowers, comprising a sheet of flexible, absorbent material having an inner face arranged to contact the stems of the flowers and an opposite outer face, an upper part, a lower part, and a central section that connects the upper part and lower part, wherein:

a length of the upper part is larger than a length of the lower part; and the upper part is adapted to be folded around stems of a bunch of cut flowers; and the lower part is adapted to be folded upwards over the stem ends and around the upper part; and a difference between the lengths of the upper and lower parts is sufficient to fold an upper portion of the upper part downwards over the lower part, when the lower part is folded over the upper part;

and wherein the central section which connects the upper part and lower part has a width of between 40% and 90% of the width of the upper part.

A central section that is narrower than the width of the upper part ensures easy folding upwards of the lower part, after the upper part has been folded around the flower stems. The length is defined in the direction that is, in use, aligned with the flower stems. This direction may also be that which is perpendicular to an imaginary straight line dividing the upper and lower parts, in the plane of the wrap. The length of both parts together may be between 15 and 40 cm. The width of each part may be between 10 and 25 cm.

According to an embodiment, the binding wrap may comprise two lateral incisions at the border between the upper part and the lower part. Providing such incisions is one way to accomplish a limited width of the central section, which promotes easy folding upwards of the lower part. The incisions may have a lateral width of approximately 2 cm, or 5% to 20% of the width of the upper part. Incisions may also refer to recesses or cut-outs in the sides of the sheet towards each other. The requirement is that they should reduce the width of the intact central section, compared to the full width of the sheet. An example of a binding wrap with incisions is a rectangular wrap which comprises a rectangular upper part and a rectangular lower part with incisions at the long sides of the wrap, adapted to be used in the method described above.

According to a further embodiment, the upper part and the lower part may have the shape of a rectangle with unequal length and equal width, which are connected at the sides which have said width, and laterally offset to one another. In this context, the width is the dimension of the wrap in the direction perpendicular to its length. The lateral direction is the direction which is parallel to the width. The lateral offset is also a way to accomplish a limited width of the central sections, which promotes an easy folding upwards of the lower part. The lateral offset may be approximately 3 cm, or 10% to 30% of the width of the upper part.

According to a yet further embodiment, the sheet forming the binding wrap may be elastically extendable for the reasons discussed above.

It will be understood that the overall dimensions of the sheet may be adapted according to the size of the bunch of flowers and their stems that it is intended to wrap. Nevertheless, certain ratios of the sheet dimensions may be preferred, independently of the size of the bunch.

According to an embodiment, the length of the upper part and the length of the lower part may have a ratio of between 2.5:1 and 1.5:1, preferably around 2:1. This allows the upper portion to fold downwards and effectively cover the complete lower portion.

According to yet a further embodiment, the binding wrap may have a thickness between 2 mm and 12 mm. The preferred thickness will, of course, depend very much on the specific material. For foam, it may be between 6 mm and 12 mm, preferably 10 mm.

BRIEF DESCRIPTION OF DRAWINGS

Embodiments will now be described, by way of example only, with reference to the accompanying schematic drawings in which corresponding reference symbols indicate corresponding parts.

The figures are for illustrative purposes only, and do not serve as a restriction on the scope or the protection as laid down by the claims.

DESCRIPTION OF EMBODIMENTS

Figure 1:
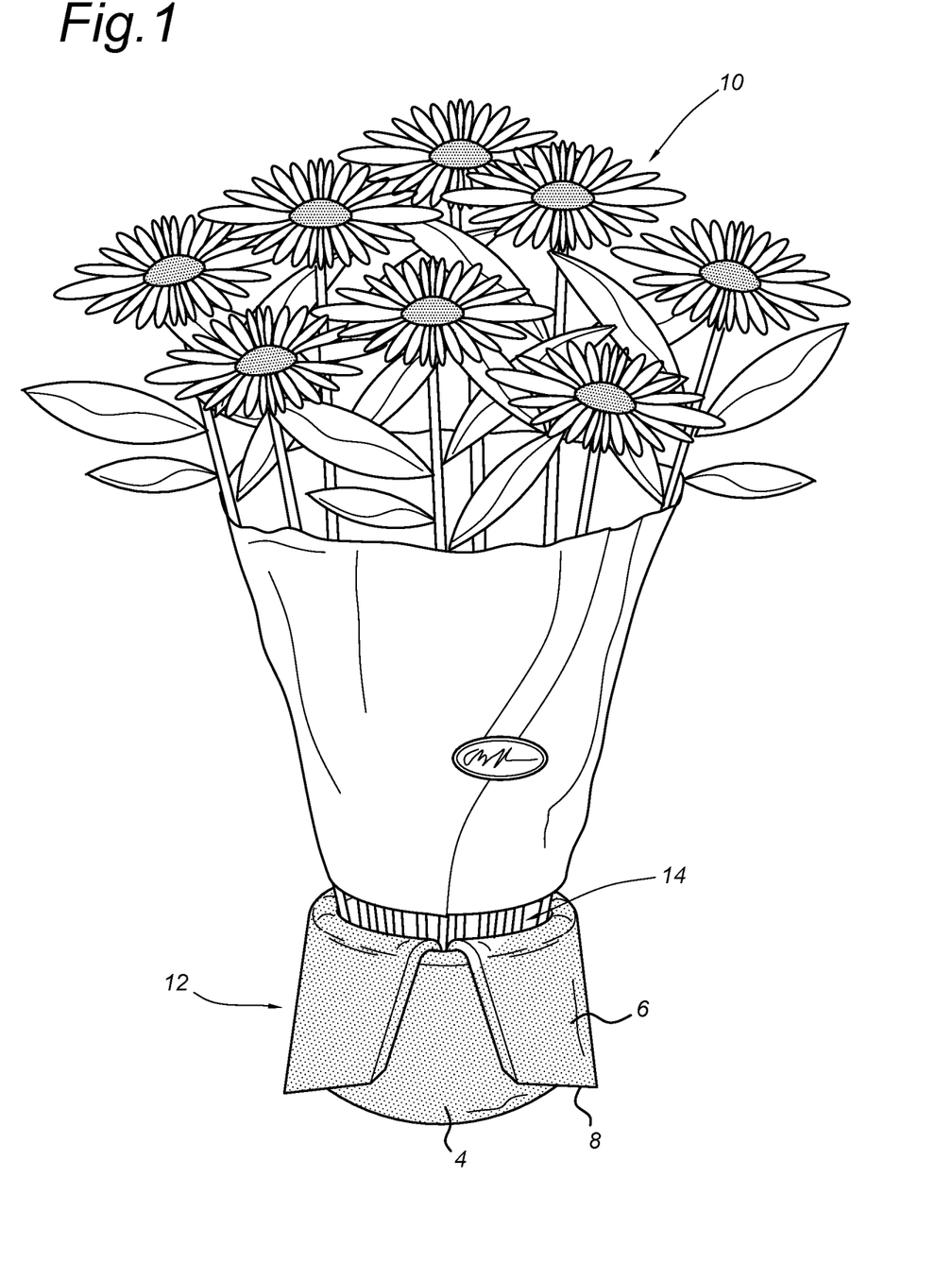
FIG. 1 schematically shows a bunch of cut flowers with a folded binding wrap, according to an embodiment of the invention.

FIG. 1 schematically shows a bunch of cut flowers 10, where a folded binding wrap 12 is attached to the stems 14. The binding wrap 12 is formed from a sheet 8 of flexible absorbent material having an inner face 6 that contacts the stems 14 and an outer face 4.

Figure 2:
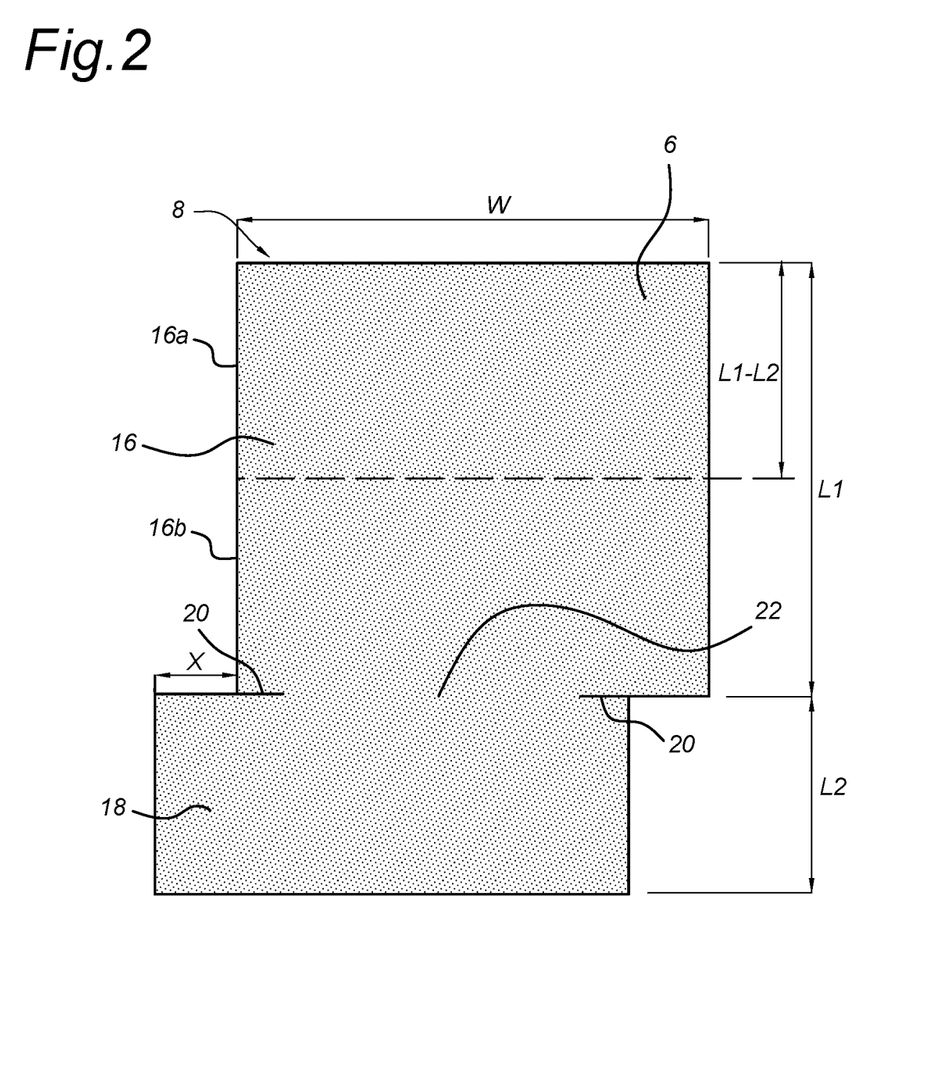
FIG. 2 shows a detailed image of the sheet used to form the binding wrap of FIG. 1.

FIG. 2 shows a detailed image of the sheet 8 of FIG. 1 in the unfolded state, viewed on the inner face 6. The sheet 8 comprises two rectangular parts, being the upper part 16 and the lower part 18. The upper part 16 has a width W and a length L1. The lower part 18 has a length L2 and, in this embodiment, is of the same width as the upper part 16 but offset laterally by a distance X. An upper portion 16a of the upper part has a length L1-L2. The remaining lower portion 16b of the upper part 16 has the length L2. Lateral incisions 20 are applied from the two sides at the border between the upper and lower parts. The two parts are connected by a central section 22.

Use of the sheet 8 to form the binding wrap 12 according to the invention will now be explained with reference to FIGS. 3a to 3f, which schematically show different steps of a method to apply the binding wrap 12 to a bunch of flowers 10.

Figure 3A:
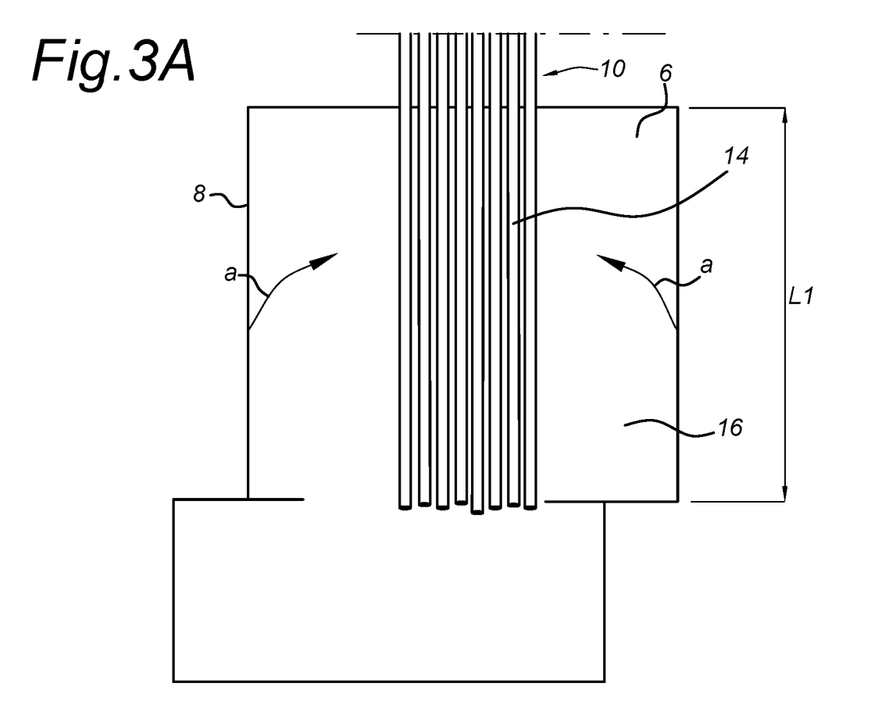
FIGS. 3A to 3F show different steps in the folding of the sheet of FIG. 2 to form the wrap according to FIG. 1.

FIG. 3A shows the stems 14 of a bunch of flowers 10 laid over the upper part 16 of the sheet 8, on the inner face 6. The stems 14 are aligned with the length dimension L1 of the upper part 16 of the sheet 8. The upper part 16 is then folded forwards around the stems 14.

Figure 3B:
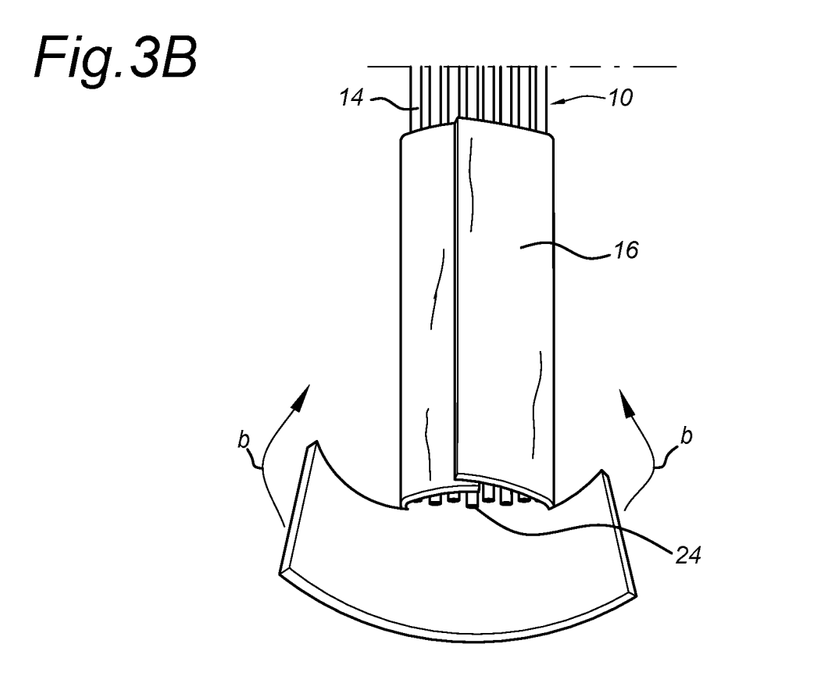

FIG. 3B shows the result of the upper part 16 folded around the stems 14, whereby the stems 14 are fully enclosed and surrounded by the upper part 16. In a following step the lower part 18 can be folded upwards over the over the cut ends 24 of the stems 14.

Figure 3C:
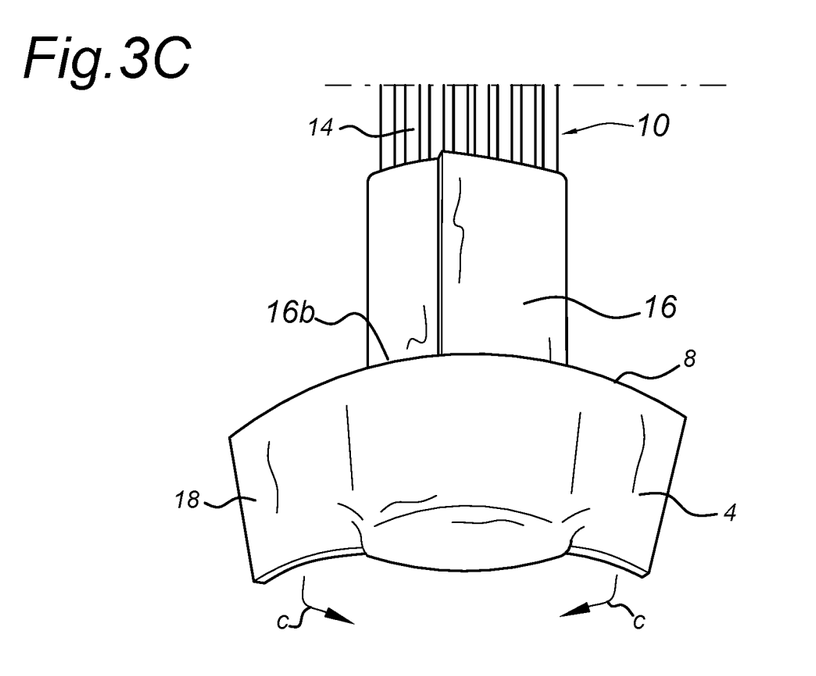

FIG. 3C shows the result of step according to FIG. 3b) with the ends 24 of the stems 14 fully covered and only the outer face 4 of the sheet 8 visible. In the next step, the lower part 18 can be folded backwards around the lower portion 16b of the upper part 16.

Figure 3D:
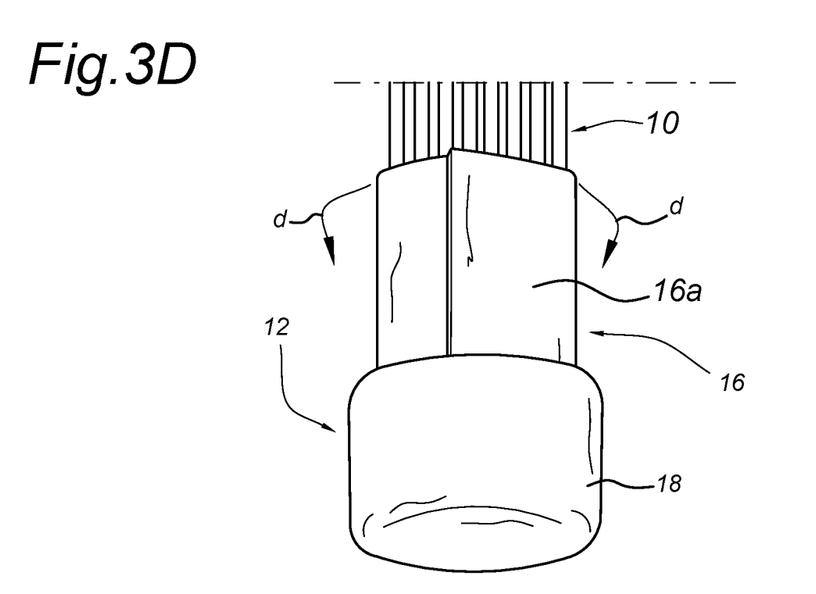

FIG. 3D shows the result of the folding of the lower part 18 around the lower portion 16b of the upper part 16. At this point, the upper portion 16a of the upper part 16 can be folded downwards over the lower part 18.

Figure 3E:
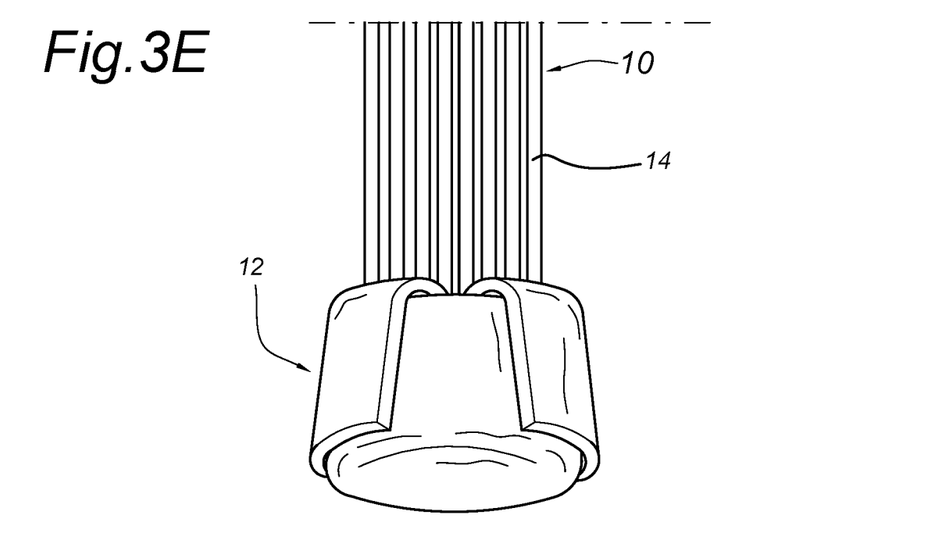

FIG. 3E shows the finished result of the previous steps, namely a folded binding wrap 12, attached around the stems 14 of the flowers 10.

Figure 3F:
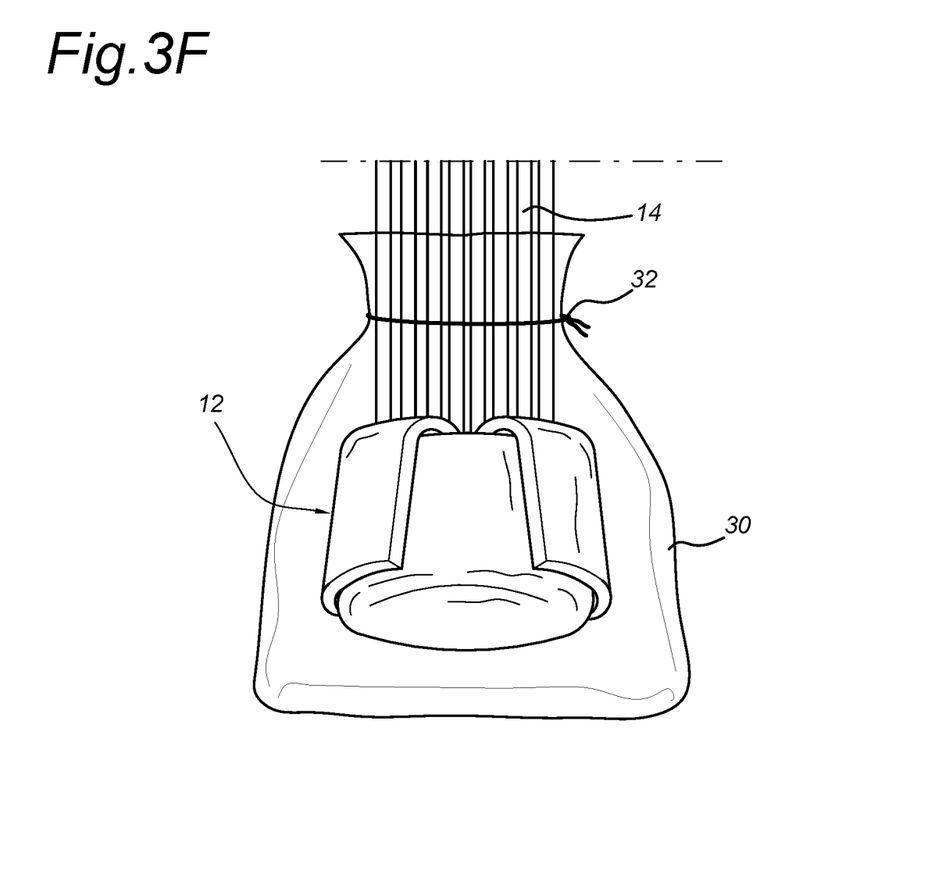

FIG. 3F shows the flower stems 14 with the binding wrap 12 inside a plastic bag 30. The bag 30 is held around the stems 14 with a tie 32. Although not depicted, the binding wrap 12 has been dipped in water and soaked prior to insertion into the plastic bag 30.

FIGS. 4A to 4E show alternative embodiments of the binding wrap.

Figure 4A:
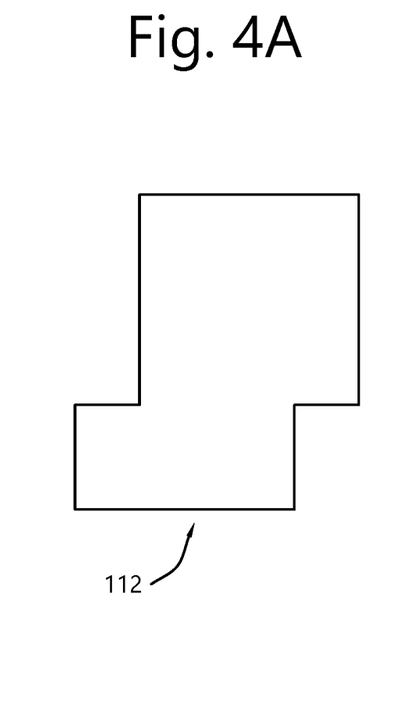
FIGS. 4A to 4E show different alternative embodiments of the invention.

FIG. 4A shows a binding wrap 112 which does not have incisions.

Figure 4B:
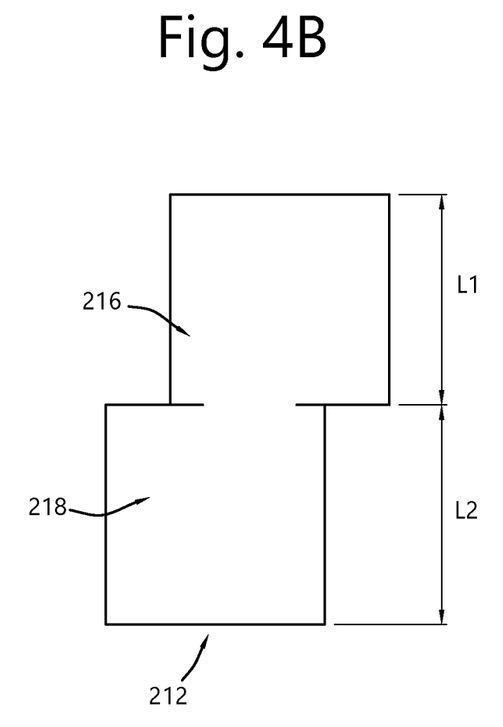

FIG. 4B shows a binding wrap 212 which comprises an upper part 216 and a lower part 218, wherein both parts have equal lengths L1 and L2.

Figure 4C:
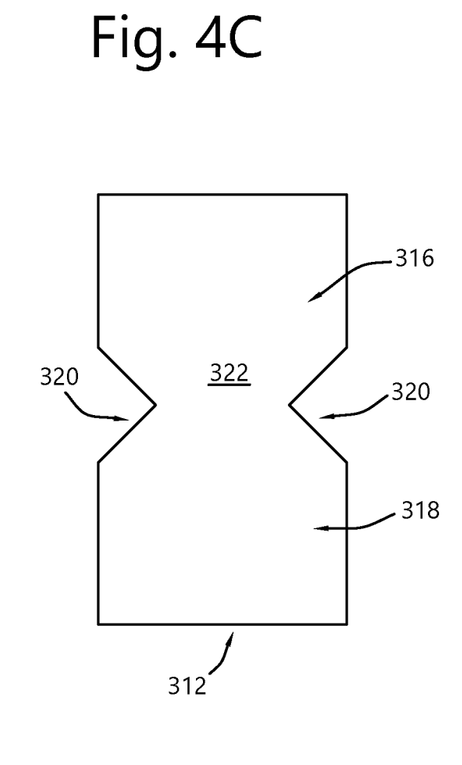

FIG. 4C shows a binding wrap 312, wherein incisions 320 are cut-outs or recesses, reducing the width of a central section 322 in between an upper part 316 and a lower part 318.

Figure 4D:
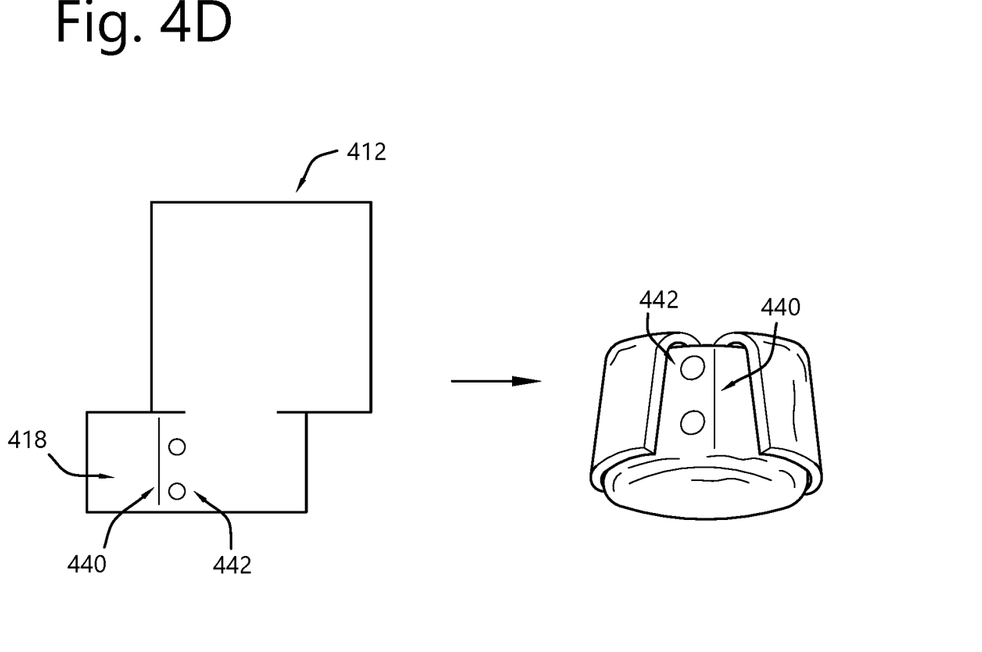

FIG. 4D shows a binding wrap 412 which includes decorations 440, 442 on a lower part 418, being a drawn line 440 and a series of cut holes 442, which give the folded wrap the appearance of a shirt collar.

Figure 4E:
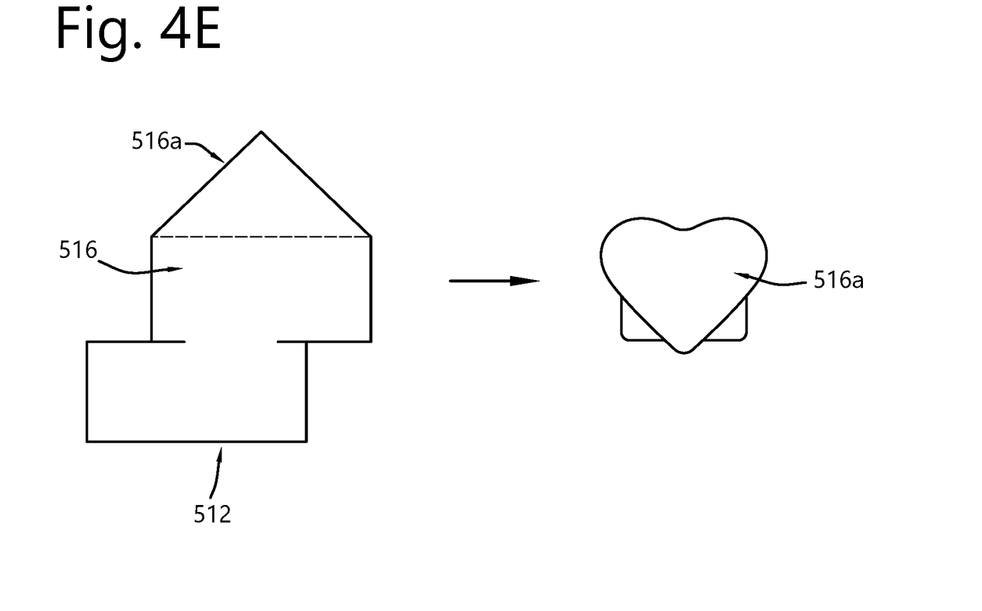

FIG. 4E shows a binding wrap 512, which comprises an upper portion 516a of an upper part 516, which has a triangular shape. As a result, the folded wrap looks like a heart-shape. This is an appealing shape, especially suitable when bouquets of flowers are presented as a gift for expressing love, for example on Valentine's Day. In this case the binding wrap may preferentially be formed from red foam.

Although the present figures consider binding wraps with specific designs, it will be clear that also other designs are included in the present invention. Alternative designs that result in a particular appearance of the binding wrap may include designs based on hourglass-shapes, parallelograms, trapezoids, polygons, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

The invention claimed is:

1. A binding wrap for cut flowers, comprising a sheet of flexible, absorbent material having an upper part, a lower part, and a central section which connects the upper part and the lower part, wherein
   the upper part has a length (L1) and the lower part has a length (L2); and
   the upper part is adapted to be folded around stems of a bunch of cut flowers; and
   the lower part is adapted to be folded upwards over the stem ends and around the folded upper part; and
   the length of the upper part (L1) is sufficient to fold an upper portion of the upper part downwards over the lower part, when the lower part is folded over the upper part;
   wherein the central section which connects the upper part and the lower part has a width of between 40% and 90% of the width of the upper part; and
   wherein the upper part and the lower part each have a width, the upper part and the lower part being connected at the sides which have said width and being laterally offset from one another.

2. The binding wrap according to claim 1, wherein the length of the upper part (L1) is larger than the length of the lower part (L2); and a difference between the lengths of the upper and lower parts (L1-L2) is sufficient to fold an upper portion of the upper part downwards over the lower part, when the lower part is folded over the upper part.

3. The binding wrap according to claim 1, wherein the sheet comprises two lateral incisions partially separating the upper part from the lower part.

4. The binding wrap according to claim 1, wherein the sheet is elastically extendable.

5. The binding wrap according to claim 1, wherein the length of the upper part (L1) and the length of the lower part (L2) have a ratio of between 2.5:1 and 1.5:1.

6. The binding wrap according to claim 1, wherein the sheet has a thickness between 2 mm and 12 mm.

7. The binding wrap according to claim 1, wherein the sheet comprises a foam material.

8. The binding wrap according to claim 1, wherein the sheet has an inner face arranged to contact the cut stems and an opposite outer face.

9. The binding wrap according to claim 1, wherein the length of the upper part (L1) and the length of the lower part (L2) have a ratio of substantially 2:1.

10. The binding wrap according to claim 1, wherein the upper part and the lower part each have the shape of a rectangle with equal width.

11. An assembly of a bouquet of cut flowers and the binding wrap of claim 1, wherein
    the binding wrap is in contact with ends of stems of the flowers such as to be able to provide hydration thereto;
    an upper part of the binding wrap is folded around the flower stems;
    a lower part of the binding wrap is folded upwards over the ends of the flower stems and around the upper part; and
    an upper portion of the upper part is folded downwards over the lower part.

12. The assembly according to claim 11, wherein the upper portion of the upper part engages and retains the lower part wrapped around the flower stems, without further securing means.

* * * * *